United States Patent Office 3,185,027
Patented May 25, 1965

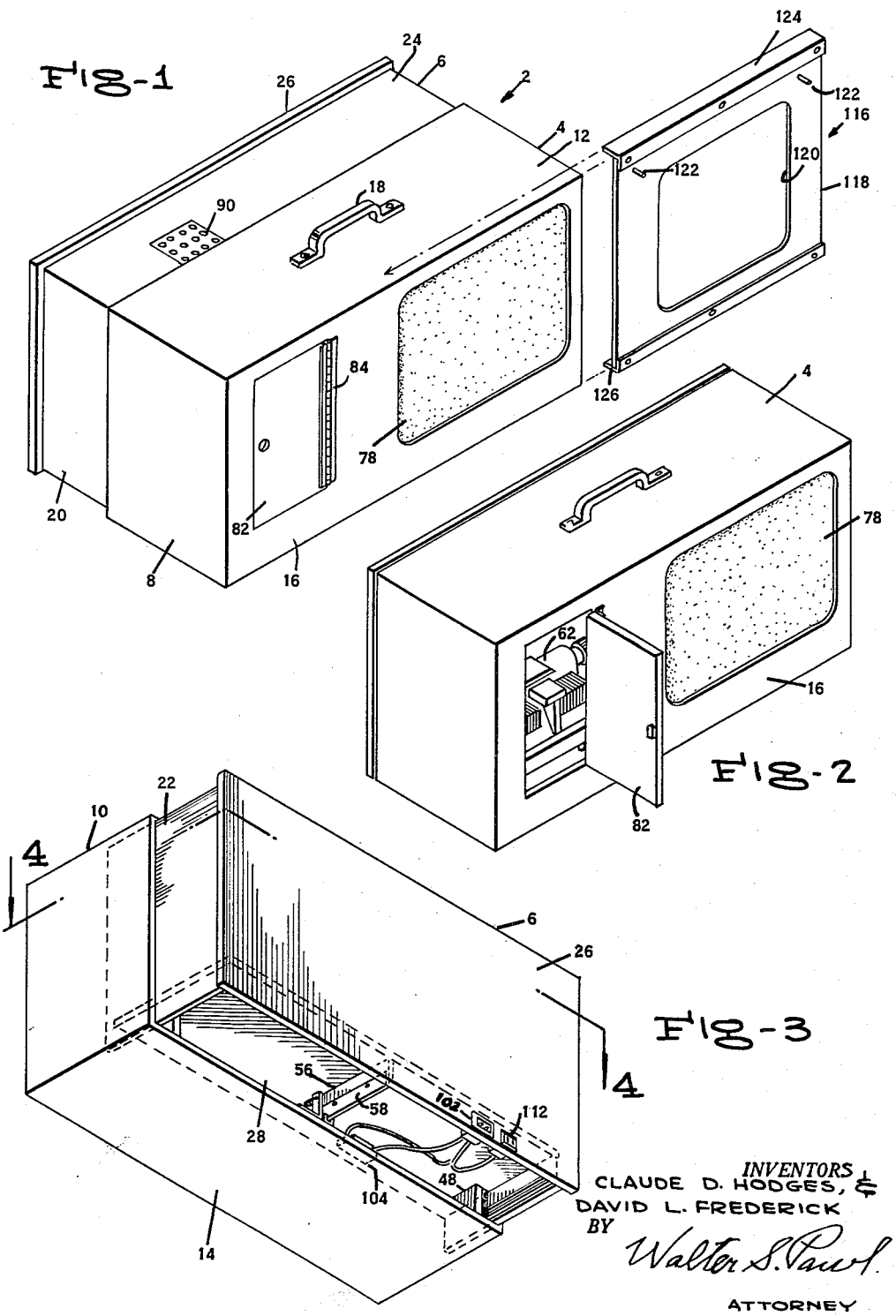

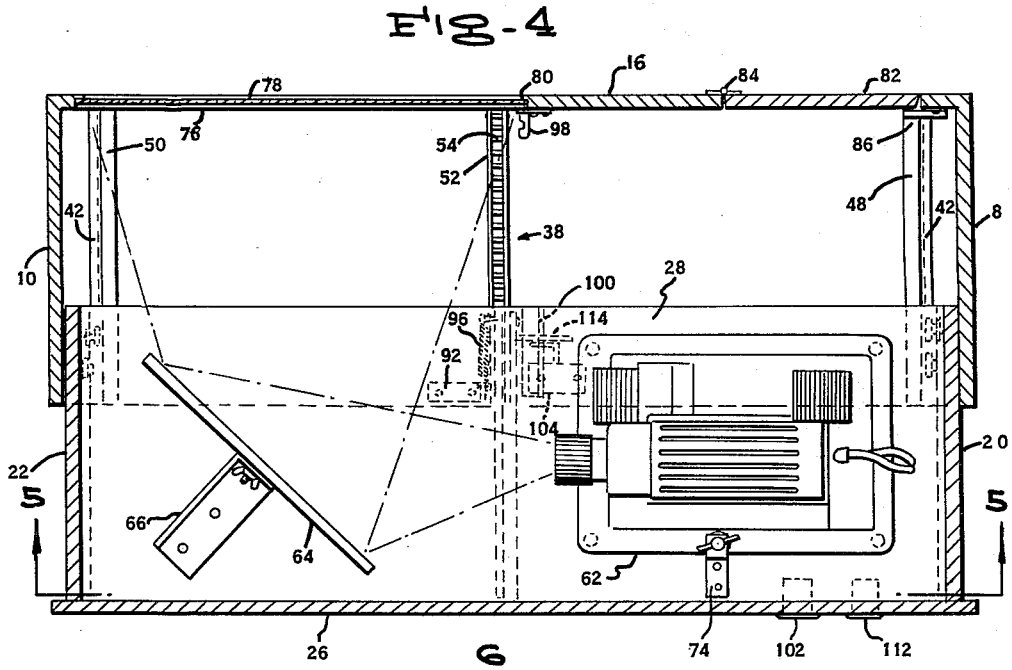
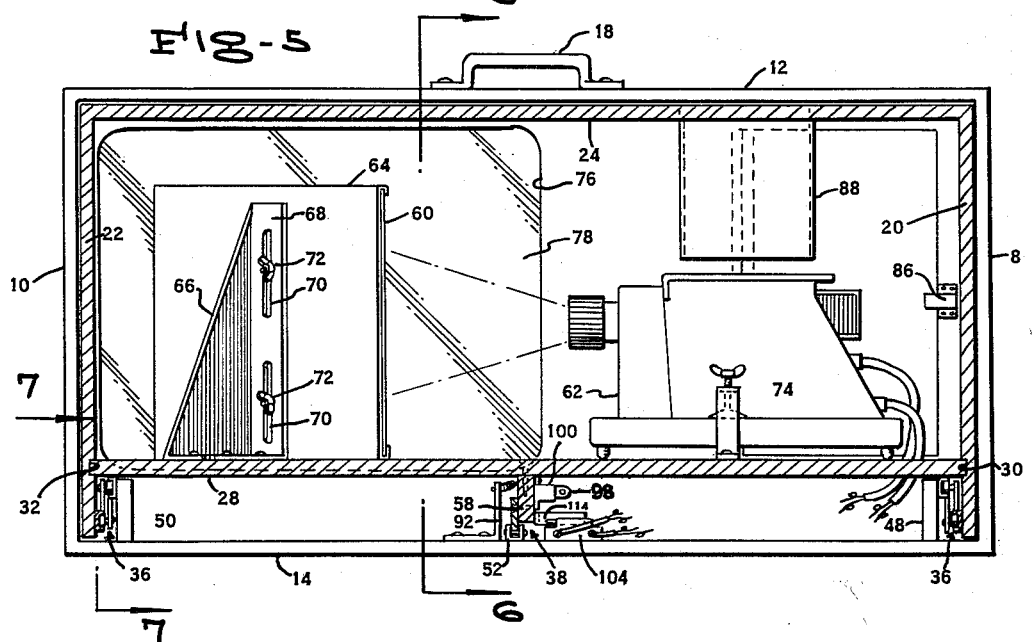

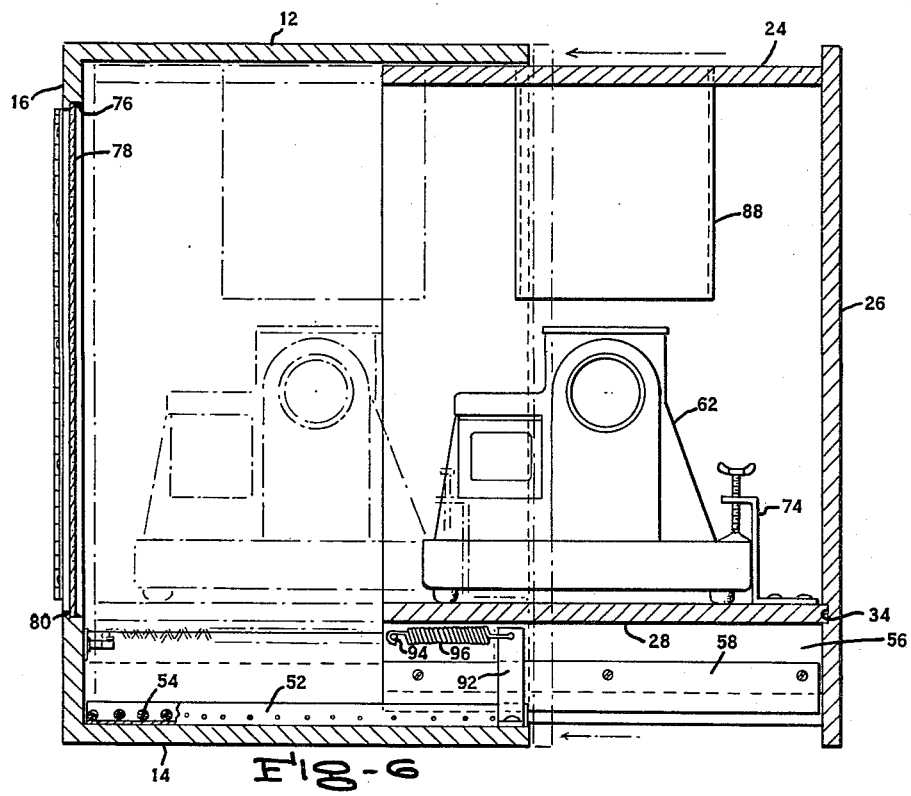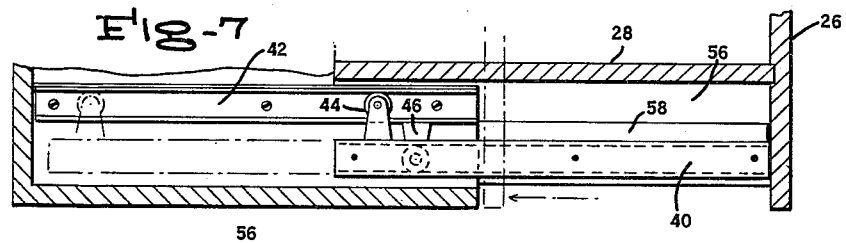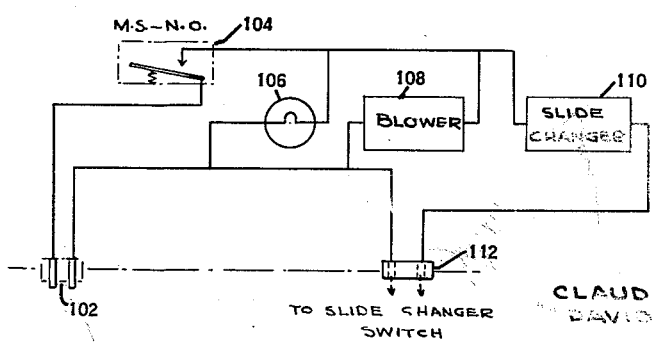

3,185,027
PORTABLE VIEWING APPARATUS
Claude D. Hodges, 6547 27th St. N., and David L. Frederick, 702 Highland St. N., both of Arlington, Va.
Filed Sept. 27, 1961, Ser. No. 141,134
11 Claims. (Cl. 88—24)

This invention relates generally to film projecting and viewing apparatus, and more particularly to an improved portable viewing apparatus especially adapted for viewing and programming transparencies and motion picture film.

It is often found desirable to view transparencies and motion film in situations and at times where the use of regular projection equipment, including individual, widely separated projector and screen units, is inconvenient. Numerous viewing and editing devices have been proposed for such instances, but are often found wanting in actual use. Among the disadvantages of prior devices of this type have been a lack of operational convenience in use, smallness of the viewing image, and a lack of compactness coupled with insufficient ease of portability. The viewer of the instant invention is designed to overcome all of these disadvantages, and in addition is economical and relatively simple in construction.

It is, therefore, the principal object of this invention to provide a viewing apparatus so constructed as to be small in dimensions, highly compact and portable, substantially automatic in operation, and economical of construction.

Another object of the invention is to provide a viewing apparatus for viewing transparencies and motion picture film, and so constructed as to present a greatly enlarged image of the film being viewed.

It is also an object of this invention to provide a viewing apparatus so constructed as to be useable with conventional, readily available projection equipment.

A further object of the invention is to provide a viewing apparatus so constructed as to be collapsible for ease of transport and storage.

Still another object of this invention is to provide a collapsible viewing apparatus including an automatically operated electrical switch, the apparatus being so constructed that upon erection thereof for viewing, its electrical circuit is automatically closed for operation.

A still further object of this invention is to provide a viewing apparatus wherein the projection equipment may be pre-loaded with film, and may be operated substantially automatically and unattended upon erection of the apparatus for viewing.

It is also an object of this invention to provide a collapsible viewing apparatus so constructed that it may be collapsed with projection equipment contained therewithin, and which protects said projection equipment during transport and storage.

Other objects and many of the attendant advantages of the invention will be readily appreciated as the same becomes better understood by reference to the following detailed description when considered in connection with the accompanying drawings, wherein:

FIG. 1 is a perspective of the collapsed viewing apparatus of the invention in its operative position, a vu-graph attachment being shown to the side with broken lines indicating the manner in which it is placed over the apparatus for use;

FIG. 2 is a view showing the viewing apparatus in a collapsed condition preparatory to transport and storage, the access door to the projection equipment being in an open position;

FIG. 3 is a bottom, rear perspective view of the apparatus in its operative position, showing in particular the electrical connections and the rail suspension mechanism;

FIG. 4 is a sectional view taken on line 4—4 in FIG. 3, and shows the interior of the apparatus in its operative position;

FIG. 5 is a view in section taken at 5—5 in FIG. 4, and shows the interior of the apparatus in rear elevation;

FIG. 6 is a cross-section taken on line 6—6 in FIG. 5, the position of the inner cabinet and its attached projection equipment when the viewing apparatus is in a collapsed condition being indicated by phantom lines;

FIG. 7 is a detail section taken at 7—7 in FIG. 5, and shows the construction of one of the suspension rails; and FIG. 8 is a schematic diagram of the electrical circuit of the viewing apparatus.

The present invention relates to portable viewing apparatus for viewing transparencies and motion picture film, and includes an outer cabinet and an inner cabinet telescopically received therewithin. The outer cabinet has an opening therein within which is positioned a viewing screen of ground glass or other suitable material. Film projection equipment is mounted within the inner cabinet and is positioned to project upon a mirror, the mirror being disposed to confront both the viewing screen and the projection equipment at the proper angle.

The inner cabinet is suspended within the outer cabinet on free-running suspension rails to provide for easy telescopic movement of the two. A micro-switch is attached to the outer cabinet, and an actuator tab is so positioned on the inner cabinet that when the two are telescopically extended the micro-switch is closed, thus closing the electrical circuit of the projection equipment. A catch is provided for securing the two cabinets in a collapsed condition.

In operation the catch is first released and the two cabinets are then telescopically extended, which closes the projection equipment's electrical circuit. The projection equipment then projects an image upon the mirror, which in turn reflects the same image upon the viewing screen. The size of the viewing screen image is controlled to a considerable degree by the amount of the extension of the two cabinets.

Referring now to the drawings, the viewing apparatus of the invention is indicated generally at 2, and includes an outer cabinet 4 and an inner cabinet 6. The outer cabinet is comprised of a pair of end panels 8 and 10, a top panel 12, a bottom panel 14, and a front panel 16. A handle 18 is secured to the top panel 12 for facilitating transport of the apparatus.

The inner cabinet 6 is telescopically received within the outer cabinet 4, and includes a pair of side panels 20 and 22, a top panel 24, a back panel 26, and a bottom panel 28 which is received within a pair of opposed grooves 30 and 32 in the side panels 20 and 22, respectively, said grooves being parallel to and spaced upwardly from the lower edges of said side panels. The bottom panel extends beyond the rear edge of the side panels 20 and 22, and is received in a groove 34 in the back panel (FIGS. 6 and 7). The peripheral dimensions of the back panel are equal to those of the outer cabinet, whereby to define a flange around the inner cabinet against which the rear face of the outer cabinet may abut when the apparatus is fully collapsed. The external peripheral dimensions of the inner cabinet are slightly less than the similar interior dimensions of the outer cabinet to provide for easy telescopic action.

The inner cabinet 6 is mounted for telescopic movement within the outer cabinet by a pair of identical free-running rail assemblies 36, and a medially positioned roller bearing track assembly 38. Each rail assembly includes a lower channel-shaped rail 40 and a similarly shaped upper rail 42. (FIGS. 5 and 7.) The lower rail has an upright standard 44 near the inner end thereof, and the upper rail has a corresponding downwardly extending standard 46 at its outer end. A roller wheel is attached to each standard, and the rails of each assembly are arranged with their channels facing in the same direction and with the roller carried by one rail received in the channel of the opposite rail.

A pair of elongated, upstanding supports 48 and 50 are secured to the bottom panel 14 of the outer cabinet 10 and extend parallel to the end panels 8 and 10 thereof, respectively. The supports are of a height slightly less than the distance between the bottom panel 28 and the lower edges of the end panels 20 and 22 of the inner cabinet 6, and are each spaced inwardly from the end panels 20 and 22 a distance sufficient to accommodate a rail assembly 36. A rail assembly is disposed within each space, and is mounted by fastening a lower rail 40 to each end panel 20 and 22 by screws or other suitable means, and an upper rail 42 to each of the standards 48 and 50. The two rail assemblies are so secured in position as to be capable of easy operation, and are positioned vertically to create a slight clearance between the inner and outer cabinets.

The roller bearing track assembly 38 consists of a track 52 positioned medially of and secured to the bottom panel 14 of the outer cabinet (FIGS. 5 and 6). The track is channel shaped, and carries a plurality of roller bearings 54. A mounting strip 56 is secured to the bottom panel 28 of the inner cabinet by screws or other suitable fasteners, and projects downwardly therefrom. A guide strip 58 is secured to said mounting strip, and rides within the channel-shaped track 52 in engagement with the roller bearings 54. The two rail assemblies and the track assembly 38 enable the two cabinets to be easily extended and collapsed.

The bottom panel 28 of the inner cabinet functions as a base upon which to mount a mirror 60 and a projector 62. The mirror 60 is mounted in a suitable frame 64, which in turn is mounted upon a sheet metal support 66. The support 66 is secured to the panel 28, and has a vertical portion 68 in which is cut a pair of elongated, aligned vertical slots 70. The mirror frame 62 has a pair of aligned threaded studs extending therefrom, which are received within said slots and which have wing nuts 72 threaded thereon. The elongated configuration of the slots permits the mirror to be adjusted vertically to the desired height, after which the wing nuts are tightened to secure the mirror in position.

The viewing apparatus of the invention is intended for use with commonly available projection equipment, either of the transparency or motion picture type. In the embodiment shown in the drawings a 35 mm. transparency projector 62 is utilized; although it is to be understood that, say an 8 mm. motion picture projector could be equally well employed. The adjustable mirror facilitates the use of equipment of varying height. The projector 62 is of the type which may be preloaded with a number of slides, and which may then be remotely controlled. It is secured to the panel 28 by a suitable screw clamp 74, which is itself secured to said panel.

The front panel 16 of the outer cabinet has an opening 76 therein within which is secured by suitable means a viewing screen 78, which may be of ground glass or other suitable material. A lip 80 extends around the opening 76, and aids in holding the screen in position. The geometric relationships between the screen 78, the mirror 60, and the projector 62 are shown in FIG. 4, wherein it is seen that the mirror is so positioned that when the projector projects an image thereupon that image will in turn be reflected upon the screen. A convenient arrangement is to have the plane of the mirror confronting both the screen and the lens of the projector, and at a 45 degree angle to both.

It is well known that the area of a projected image increases as the distance between the surface upon which the image falls and the projector is increased. In the instant invention, therefore, the image falling upon the mirror is larger than that existing nearer the projector. Similarly, the image reflected upon the screen is larger than that upon the mirror (illustrated by phantom lines in FIG. 4). It is therefore seen that if the screen is moved away from the mirror, the image on the screen will increase in size, and vice versa. Thus, the collapsible arrangement of the viewing apparatus of the invention makes it possible, by extending the two cabinets, to obtain an image of adequate dimensions for convenient viewing, while by collapsing, or telescoping, the cabinets, the apparatus may be made compact for transport or storage. When the cabinets are in a telescoped condition they serve as a transporting and storage case for the projection equipment contained therein.

To provide ready access to the projector 62 a door 82 is mounted by a hinge 84 in a suitable opening in the front panel 16 of the outer cabinet. The door is held in a closed position by a magnetic catch means 86 (FIG. 5). For providing cooling air to the projector equipment a duct 88 is fitted within a properly positioned opening in the top panel 24 of the inner cabinet, and extends thereinto. A grill 90 (FIG. 1) is fitted into the upper end of the duct to prevent larger foreign objects from entering the cabinet.

To facilitate extending the two cabinets a spring arrangement is employed, and includes an upwardly projecting angle iron 92 fixed to the bottom panel 14 of the outer cabinet adjacent to the rear edge thereof, and a pin 94 projecting from one side of mounting strip 56 near its forward end. The upstanding portion of the angle iron is spaced a short distance from the mounting strip, and a spring 96 is attached thereto and extends between it and pin 94. Thus, the spring exerts a force tending to separate the two cabinets. The two cabinets are secured in their closed or collapsed position against the force of the spring by a cabinet latch, which includes a hooked portion 98 attached to the front panel 16 of the outer cabinet, and a body or socket portion 100 attached to the mounting strip 56.

The latch employed is of a commercially available type wherein the two elements to be secured together are, as here, subjected to forces which tend to move them apart. The two elements are latched in a slightly spaced apart position (as is illustrated in FIG. 2, wherein note the space between the back panel 26 and the outer cabinet 4), and the latch operates in such a manner that when the two elements to be latched are first brought together the hooked portion enters the body portion and is held therein, with the elements spaced slightly apart. If then the two elements are pressed into engagement the hooked portion is released, and the elements are unlatched. Thus, in the invention the two cabinets are latched in a closed position by exerting force on the front and back panels 16 and 26 until the hooked portion 98 is received and secured within body portion 100. The cabinets will then still be slightly spaced, as shown in FIG. 2. When it is desired to open the apparatus to its operative position force is again exerted upon the front and back panels until the latter engages with the outer cabinet. The latch is then released, and the spring causes the cabinets to separate. It should be noted that the spring in its collapsed condition (FIG. 6) tends to hold the apparatus in its extended, operative position.

It is to be understood, of course, that the invention is not limited to the type of latch mechanism just described, but that numerous other latching arrangements, such as a hand activated catch or an ordinary hook and eye arrangement, could equally well be utilized.

The electrical circuit of the viewing apparatus of the invention is so constructed that it is automatically closed when the cabinets are extended to their operative position. Referring to FIG. 8, wherein the circuit of the apparatus is illustrated schematically, a pair of terminals are shown at 102. A micro-switch 104 is placed in one leg of the circuit, and the projector 62, which includes a lamp 106 and a blower 108 connected in parallel, is connected between said terminals through said switch. The projector, as has already been mentioned, is also equipped with an automatic slide changer 110, which is connected in parallel with the blower 108 through a second pair of terminals 112. The terminals 102 and 112 are mounted upon the back panel 26, as shown in FIG. 3, to facilitate making electrical connections with the apparatus. The lead from a slide changer control switch is connected to the terminals 112, and provides for remote control of the changer.

The micro-switch 104 is spring biased to remain normally open, and is secured to the bottom panel 14 of the outer cabinet adjacent to mounting strip 560. The latter has an actuator tab 114 projecting therefrom forwardly of the switch. Thus, when the cabinets are separated sufficiently toward their operative position the tab 114 will engage and close the micro-switch 104. Similarly, when the cabinets are telescoped together the tab will disengage from the micro-switch, and the latter will automatically open.

The viewing apparatus of the invention is adapted for use with a vu-graph attachment, the latter being shown at 116 in FIG. 1. This attachment is useful for framing a portion of a projected image, or for mounting a filter, graph paper, or other similar element over the viewing screen, and includes a plate 118 having an opening 120 therein and element-supporting pins 122 and 126 attached to the top and bottom edges thereof, respectively, which are spaced apart a distance equal to the height of the outer cabinet. Thus, the attachment may be readily placed in position over the viewing screen 78.

From the above description it is readily seen that a viewing apparatus has been provided which readily fulfills the objects set forth for the invention, and which is especially suitable for editing or small audience programming of transparencies and motion picture film.

Obviously, many modifications and variations of the present invention are possible in the light of the above teachings. It is, therefore, to be understood that within the scope of the appended claims, the invention may be practiced otherwise than as specifically described.

What is claimed is:

1. In an apparatus for viewing transparencies and the like, an outer cabinet, an inner cabinet telescopically received within said outer cabinet, said outer cabinet including a front panel having an opening therein, a viewing screen of translucent material secured within said opening, means within said inner cabinet for mounting projection equipment, and a mirror mounted within said inner cabinet and so arranged relative to said projection equipment and said screen that an image projected thereupon by said equipment will be reflected unto said screen.

2. In a viewing apparatus as recited in claim 1, including additionally means for suspending said inner cabinet within said outer cabinet to provide for easy telescopic movement thereof, spring means connected to said cabinets and arranged to urge them to extend, and releaseable latch means for retaining said cabinets in a collapsed condition.

3. In a viewing apparatus as recited in claim 1, wherein said projection equipment includes an electrical circuit, and including additionally switch means connected with said circuit and attached to one of said cabinets, said switch means being arranged for opening and closing said circuit in response to collapsing and extending telescopic movements, respectively, of said cabinets.

4. In an apparatus for viewing transparencies and the like, an outer cabinet, an inner cabinet telescopically received within said outer cabinet and having a bottom panel spaced therefrom, said outer cabinet including a front panel having an opening therein, a viewing screen of translucent material secured within said opening, means within said inner cabinet and attached to said bottom panel for mounting projection equipment in a position to project an image in a direction generally parallel to said screen, a mirror, and means attached to said bottom panel for mounting said mirror relative to said screen and said projection equipment so that an image projected upon said mirror by said equipment will be reflected unto said screen.

5. In a viewing apparatus as recited in claim 4, including additionally means disposed below said bottom panel and attached to said panel and to said outer cabinet for suspending said inner cabinet within said outer cabinet to provide for easy telescopic movements thereof, spring means connected to said cabinets and arranged to urge them to extend, and releasable latch means attached to said cabinets for retaining them in a collapsed condition.

6. In a viewing apparatus as recited in claim 5, wherein said projection equipment includes an electrical circuit, and including additionally switch means connected with said circuit and attached to one of said cabinets, said switch means being arranged for opening and closing said circuit in response to collapsing and extending telescopic movements, respectively, of said cabinets.

7. An apparatus for viewing transparencies and the like, including an outer cabinet, an inner cabinet telescopically received within said outer cabinet and having a bottom panel spaced therefrom, said outer cabinet including a front panel having an opening therein near one end of said cabinet, a viewing screen of translucent material secured within said opening, projection equipment positioned upon said bottom panel and arranged to project an image in a direction generally parallel to said screen, means for securing said equipment to said panel, a mirror, and means attached to said panel for mounting said mirror relative to said screen and said projection equipment so that an image projected upon said mirror by said equipment will be reflected unto said screen.

8. An apparatus as recited in claim 7, including additionally means, including a plurality of free-running rail assemblies, disposed below said bottom panel and attached to said panel and to said outer cabinet for suspending said inner cabinet within said outer cabinet to provide for easy telescopic movement thereof, spring means connected to said cabinets and arranged to urge them to extend, and releasable latch means attached to said cabinets for retaining them in a collapsed position.

9. An apparatus as recited in claim 7, wherein said projection equipment includes an electrical circuit, and including additionally switch means connected with said circuit and attached to one of said cabinets, said switch means being arranged for opening and closing said circuit in response to collapsing and extending telescopic movements, respectively, of said cabinets.

10. An apparatus as recited in claim 7, wherein said means for mounting said mirror includes an upright standard attached to said bottom panel, and including means on said standard for permitting adjustment in the height of said mirror above said bottom panel.

11. An apparatus as recited in claim 7, wherein additionally said front panel is provided with a door for permitting access to said projection equipment, and wherein said inner cabinet is fitted with duct means for providing cooling air to said equipment.

References Cited by the Examiner
UNITED STATES PATENTS

| | | | |
|---|---|---|---|
| 2,268,450 | 12/41 | Haggett | 88—24 |
| 2,272,622 | 2/42 | Rundle | 88—24 |
| 2,299,657 | 10/42 | Rystedt | 88—24 |
| 2,730,011 | 1/56 | Kleinhample et al. | 88—24 |

LEYLAND M. MARTIN, *Primary Examiner.*

EMIL G. ANDERSON, *Examiner.*